(12) United States Patent
Hengel et al.

(10) Patent No.: US 8,987,630 B2
(45) Date of Patent: Mar. 24, 2015

(54) METHOD FOR ADHESIVE BONDING TOGETHER OF METAL SHEETS

(75) Inventors: James F. Hengel, Romeo, MI (US); Pei-Chung Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2567 days.

(21) Appl. No.: 11/432,462

(22) Filed: May 11, 2006

(65) Prior Publication Data
US 2007/0262057 A1 Nov. 15, 2007

(51) Int. Cl.
*B23K 11/06* (2006.01)

(52) U.S. Cl.
CPC ............. *B23K 11/06* (2013.01); *B23K 2201/18* (2013.01)
USPC .............................................. 219/81; 219/84

(58) Field of Classification Search
USPC ...................................................... 219/81, 84
See application file for complete search history.

(56) References Cited

U.S. PATENT DOCUMENTS

| 4,037,073 | A | * | 7/1977 | Becker ............................ 219/92 |
| 4,117,296 | A | * | 9/1978 | Becker ....................... 219/91.21 |
| 4,197,341 | A | * | 4/1980 | Rule .............................. 428/118 |
| 4,264,663 | A | * | 4/1981 | Beenken ....................... 428/133 |
| 4,395,472 | A | * | 7/1983 | Robillard ..................... 430/47.5 |
| 6,921,869 | B2 | * | 7/2005 | Terunuma et al. ............ 174/256 |
| 2006/0060296 | A1 | * | 3/2006 | Sigler et al. ................ 156/272.2 |

* cited by examiner

*Primary Examiner* — Henry Yuen
*Assistant Examiner* — Ayub Maye

(57) ABSTRACT

A method is provided for adhesively bonding together a pair of metal sheets to form a laminated sheet metal assembly. A coating of heat curable adhesive is placed on the bottom sheet. The top sheet is placed on top of the coating of adhesive. The stacked metal sheets are then placed between a pair of electrodes. One of the electrodes has a pointed projection that pierces through at least the adjacent sheet and into the adhesive. Electrical current is then conducted between the electrodes so that current flows through the projection to create electric resistance heating and thereby cure the adhesive. The electrodes can be rotating rollers and the metal sheets are fed between the rollers. The electrodes can provide heating and curing of the adhesive in a spot surrounding the pointed electrode and then the remaining uncured adhesive can be cured during later heating of the laminated assembly.

17 Claims, 1 Drawing Sheet

METHOD FOR ADHESIVE BONDING TOGETHER OF METAL SHEETS

FIELD OF THE INVENTION

The present invention relates to a method for adhesively bonding together sheets of metal.

BACKGROUND OF THE INVENTION

It is known to form a laminated product by bonding together two or more sheets of metal. A layer of adhesive is placed between the metal sheets and the adhesive is cured. The adhesive may be a heat curable adhesive and the metal sheets are passed through an oven in order to elevate the temperature to a level and for a period of time sufficient to cure the adhesive. Considerable energy cost may be incurred in order to heat the metal sheets. And the heating ovens require a substantial investment of capital and floor space. The heating and cooling of the metal sheets to cure the adhesive add to processing times.

In the interest of manufacturing competitiveness, modern manufacturing operations need to run at high speed and at low cost, and thus there is interest in new and improved bonding methods of adhesive bonding of metal sheets.

SUMMARY OF THE INVENTION

A method is provided for adhesively bonding together a pair of metal sheets to form a laminated sheet metal assembly. A coating of heat curable adhesive is placed on the bottom sheet. The top sheet is placed on top of the coating of adhesive. The stacked metal sheets are then placed between a pair of electrodes. One of the electrodes has a pointed projection that pierces through at least the adjacent sheet and into the adhesive. Electrical current is then conducted between the electrodes so that current flows through the projection to create electric resistance heating and thereby cure the adhesive. The electrodes can be rotating rollers and the metal sheets are fed between the rollers. The electrodes can provide heating and curing of the adhesive in a spot surrounding the pointed electrode and then the remaining uncured adhesive can be cured during later heating of the laminated assembly.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
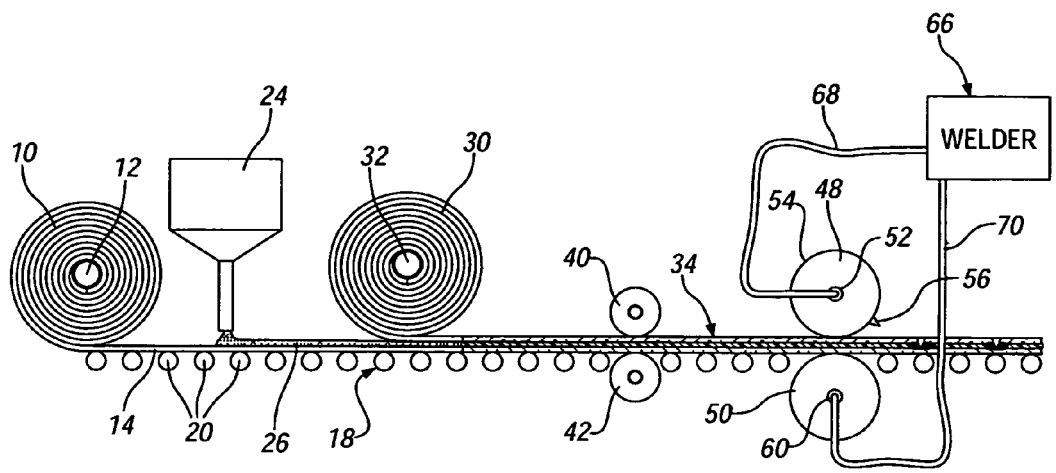
FIG. 1 is a schematic view of a method and apparatus according to the invention.

Referring to FIG. 1, a first coil 10 of steel is supported on a spindle 12 and the steel sheet 14 is unwound from the first coil 10 and fed onto a roller conveyor 18 that is comprised of a plurality of rollers 20.

An adhesive dispenser 24 is located adjacent to and downstream of the first coil 10 for dispensing a coating of adhesive 26 onto the surface of the steel sheet 14 as the steel sheet 14 passes beneath the adhesive dispenser 24. The adhesive 26 is a liquid heat curable adhesive such as Dow 1482, manufactured by The Dow Chemical Company.

A second coil 30 of steel is supported on a spindle 32 adjacent to and downstream from the adhesive dispenser 24. Steel sheet 36 is unwound from the second coil 30 and lies atop the adhesive coating 26 on the steel sheet 14. In this way, a laminate steel sheet product, generally indicated at 34, is prepared, including the bottom steel sheet 14, the layer of adhesive 26, and the top steel sheet 36. A top pressure roller 40 engages the top steel sheet 36 and a bottom pressure roller 42 engages the lower steel sheet 14, to squeeze the laminate structure to a desired thickness.

An upper electrode roller 48 and a lower electrode roller 50 are provided downstream from the pressure rollers 40 and 42. The upper electrode roller 48 is supported on a spindle 52 and is located above the laminate steel sheet product 34. The upper electrode roller 48 engages the top laminate steel sheet 34 and is coated with a dielectric material 54, such as rubber, plastic or ceramic coating. In addition the upper electrode roller has a plurality of projecting electrodes spaced along its length, a typical one of which is electrode 56. The electrode 56 has a sharpened point so that the electrode 56 will pierce through the top steel sheet as the laminate 34 passes beneath the upper electrode roller 48 and the electrode roller 48 revolves around the spindle 52. The lower electrode roller 50 is supported by a spindle 60 and contacts and supports the lower steel sheet 14.

FIG. 1 also shows a welder 66 that provides electric current and is connected to the upper electrode roller 48 by a cable 68. Suitable electrical conductors are provided with the upper electrode roller 48 to electrically connect each of the electrodes 56 to the cable 68. The lower electrode roller 50 is electrically connected to the welder 66 by a cable 70.

In operation, it will be understood that as the laminated steel sheet 34 passes between the electrode rollers 48 and 50, the rotation of the upper electrode roller on about the spindle 52 will cause the electrodes 56 to fall upon the top steel sheet 36 and to pierce through top upper steel sheet 36 and through the adhesive coating 26. The length of the electrodes 56 is such that the electrodes 56 will also pierce at least part of the way into the bottom steel sheet 14, or at least come into close contact or near close contact with the bottom steel sheet 14 so that electrical current can arc across the remaining gap. Thus, although the presence of the layer 26 would normally prevent the flow of electrical current between the upper and lower steel sheets 36 and 14, the projections 56 will provide a path for flow of electrical current.

As the electrodes 56 are piercing the laminate 34, the welder 66 is triggered so that electrical current will flow through the electrodes 56, to the bottom steel sheet 14 and thence to the lower electrode roller 50. This induces electrical resistance heating and generates a localized heating of the steel sheets 14 and 36 and the adhesive coating 26 in the region of the electrodes 56, to thereby at least partially cure the adhesive 26 to adhesively bond the top steel sheet 36 and the bottom steel sheet 14.

Figure 2:
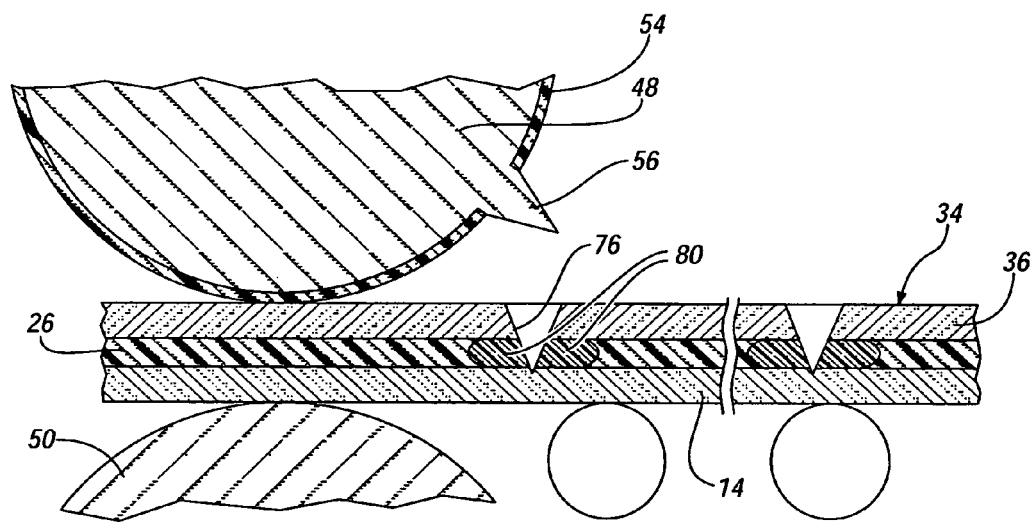
FIG. 2 is an enlarged fragmentary view of FIG. 1.

Referring to FIG. 2, a fragment of the laminate 34 is shown and it is seen that hole 76 is formed in the upper steel sheet 36, and that a region of the curable adhesive coating 26 has been cured to form an adhesive bond 80.

The aforedescribed adhesive bonding together of the top steel sheet 36 and lower steel sheet 14 provides a laminate steel product 34 that is sufficiently robust to enable the subsequent processing, such as metal forming processes that will result in the manufacture of the desired final product, for example, a stamped panel for a motor vehicle. Such subsequent processing will typically include the passage of the manufactured component through a paint-curing oven, which will complete the curing of the heat curable adhesive. In other applications, it may be sufficient or desirable to rely on only the adhesive bonds 80 provided at the site of the electrode hole 76, in which case other portions of the adhesive coating will not be completely heat cured, but perhaps subject to progressive age curing of the adhesive during the life cycle of the product.

The forgoing description of the invention is merely exemplary in nature and, thus, variations thereof are intended to be within the scope of the invention. For example, although the drawing shows a continuous process in which coils of steel sheet are continuously processed to form a continuous laminate product, the process can also be a conducted as a batch process, in which previously blanked steel sheets are bonded together. In this case, an adhesive is applied to a bottom steel sheet, a top sheet is placed over the bottom sheet, and then the stacked assemblage is passed through a rolling mill, which includes the upper and lower electrode rollers. Or, the electrode can be mounted upon a press that lowers the electrode onto the stacked assemblage to cause the electrode to pierce the upper steel sheet.

In addition, it will be appreciated that any number of electrodes can be employed; depending upon how many points of adhesive bonding are desired. The number of points of adhesive bonding is determined by the spacing between the electrodes, for example, one or more rows of electrodes can be provided around the surface of the upper electrode roller, and each row can have one or more electrodes. Nonetheless, it is appreciated that piercing through the laminate product will leave a hole in the upper steel sheet and it is therefore necessary to balance the desire for effective adhesive bonding between the steel sheets with the fact that it may be desirable to limit the number of holes that will remain in the finished laminate product.

The length of the electrodes can vary, provided however that the electrodes are sufficiently long to assure the low of electrical current between the electrodes and the lower steel sheet to obtain the desired degree of curing of the heat curable adhesive.

In addition, it will be understood that the extent of the heating to cure the adhesive can be varied by controlling the current level and current duration.

The description of the invention is merely exemplary in nature and, thus, variations thereof are intended to be within the scope of the invention.

What is claimed is:

1. A method of adhesively bonding together a pair of metal sheets, comprising:
   placing a heat curable adhesive between the pair of metal sheets;
   positioning the pair of metal sheets between a pair of electrodes, at least one of the pair of electrodes having a projection that pierces through at least one of the pair of metal sheets and into the adhesive;
   and conducting electrical current between the pair of electrodes so current flows through the projection to create heat and thereby cure the heat curable adhesive.

2. The method of claim 1 in which the projection is of a length sufficient to pierce through the at least one of the pair of metal sheets and through the adhesive and also pierce at least part way through the other of the pair of metal sheets.

3. The method of claim 1 in which the projection is of a length sufficient to pierce through the at least one of the pair of metal sheets and pierce through the adhesive and make electrical contact with the other of the pair of metal sheets.

4. The method of claim 1 in which the projection is of sufficient length to pierce through the at least one of the pair of metal sheets and through at least enough of the adhesive to enable the electric current to arc across to the other of the pair of metal sheets.

5. The method of claim 1 in which only an adhesive spot surrounding the projection is cured by electric resistance heating and the pair of metal sheets are later heated in an oven to obtain heat curing of a remaining uncured adhesive.

6. The method of claim 1 in which the pair of metal sheets are passed between rollers and one of the rollers has the electrode mounted thereon that pierces through the at least one of the pair of metal sheets.

7. The method of claim 6 in which the electrode is pointed.

8. The method of claim 1 in which the heat induced by the electric current heats and cures only a spot of adhesive that surrounds the projection and then the remaining uncured adhesive between the pair of metal sheets is cured by heating the sheet metal panels in an oven.

9. A method of adhesively bonding together a first metal sheet and a second metal sheet, comprising:
   coating the first metal sheet with heat curable adhesive to provide an adhesive coating;
   placing the second metal sheet on the adhesive coating the first metal sheet to form a laminate assembly;
   feeding the laminate assembly between a first roller supporting the first metal sheet and a second roller, at least one of the rollers having at least one pointed projection for piercing through one of the first and second metal sheets as the laminate assembly feeds between the upper and lower rollers;
   and conducting electric current between the at least one pointed projection of the at least one of the rollers having at least one pointed projection and the other of the rollers as the pointed projection pierces the one of the first and second metal sheets to thereby induce electric resistance heating of the adhesive coating to cure the adhesive.

10. The method of claim 9 in which the second metal sheet and the first metal sheet are stored in coils, the first metal sheet is uncoiled and coated with the heat curable adhesive, and then the second metal sheet is unwound and placed on top of the heat curable adhesive.

11. The method of claim 9 in which a plurality of pointed projections are provided.

12. The method of claim 9 in which a source of electrical current is electrically connected to the at least one pointed projection and to the other of the rollers.

13. The method of claim 12 in which the at least one of the rollers having at least one pointed projection has a surface of a dielectric material.

14. The method of claim 12 in which the adhesive surrounding the pointed projection is cured by electric resistance heating and other adhesive is cured during subsequent heating of the laminate assembly in an oven.

15. A method of adhesively bonding together a bottom metal sheet and a top metal sheet, comprising:
   uncoiling the bottom metal sheet from a coil;
   coating the uncoiled bottom metal sheet with heat curable adhesive to provide an adhesive coating;

uncoiling the top metal sheet onto the adhesive coating that coats the bottom metal sheet to form a laminate assembly;

feeding the laminate assembly between a lower roller supporting the bottom metal sheet and an upper roller, the upper roller having a plurality of pointed electrodes projecting from the upper roller for piercing through the top metal sheet as the laminate assembly feeds between the upper and lower rollers;

and conducting electric current between the pointed electrodes of the upper roller and the lower roller as the pointed electrodes pierce the top metal sheet to thereby induce electric resistance heating of the adhesive coating to cure the adhesive.

16. The method of claim 15 in which the upper roller is of a dielectric material and the pointed electrodes project from the dielectric material.

17. The method of claim 15 in which the extent of the curing of the heat curable adhesive is controlled by controlling current level and duration.

\* \* \* \* \*